(No Model.)
H. EWING.
SAFETY GUARD FOR RAILWAYS.
No. 433,892. Patented Aug. 5, 1890.
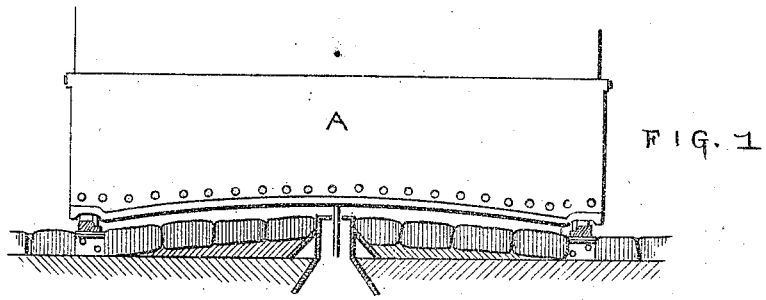
Fig. 1
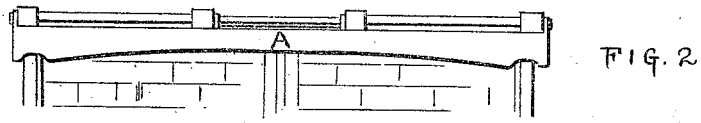
Fig. 2
Fig. 3    Fig. 4.
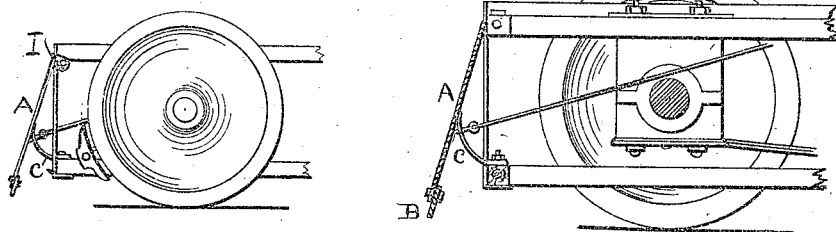
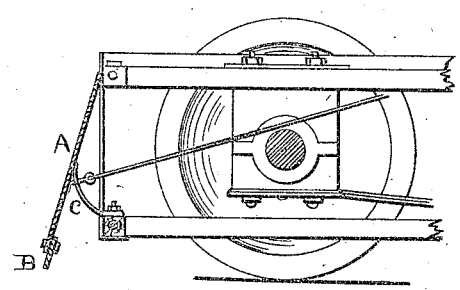
Fig. 5.    Fig. 6
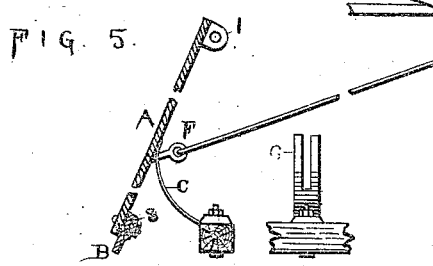
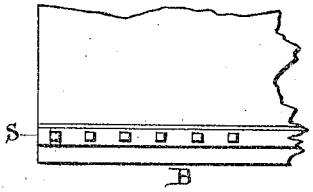
WITNESSES
John J. Newsom
Thos. D. Newsom
INVENTOR
Horace Ewing

UNITED STATES PATENT OFFICE.

HORACE EWING, OF SAN FRANCISCO, CALIFORNIA.

SAFETY-GUARD FOR RAILWAYS.

SPECIFICATION forming part of Letters Patent No. 433,892, dated August 5, 1890.

Application filed May 13, 1889. Serial No. 310,685. (No model.)

*To all whom it may concern:*

Be it known that I, HORACE EWING, a citizen of the United States, and a resident of the city and county of San Francisco, and in the State of California, have invented a certain new and useful Safety-Guard for Protecting Life and Limb from Accident upon Cable and Street Railways; and I do hereby declare that the following is a full, clear, and exact description thereof, reference being had to the accompanying drawings, and to the letters of reference marked thereon, making a part of this specification.

My invention relates to a new and useful device consisting of a safety-guard for protecting life and limb from accident upon cable and street railways. I accomplish this by means of an iron plate of the proper dimensions to fit the car to which it is to be attached in front of the forward wheels thereof, with a plate of rubber to be secured to the extreme lower edge of the iron plate on the back side of the same by means of an iron strap and bolts running through both plate rubber and strap. This safety-guard for the protection of life and limb is intended to work automatically as well as pedal and rod attached, whereby it will close down to the track by a slight weight or pressure applied in front of main plate, thereby making it impossible for accidents to occur to life or limb by reason of falling or being thrown in front of the wheels of the car or dummy.

Figure 1 is a front view of safety-guard attached to car or dummy.

Fig. 2 is a view of safety-guard, looking from top downward.

Fig. 3 is a side view of front portion of truck with safety-guard attached.

Fig. 4 is a sectional view of truck with safety-guard attached.

Fig. 5 shows sectional parts, viz: A represents body of safety-guard. B is rubber attached to iron plate. C is spring for holding safety-guard raised. D is pedal and rod connecting safety-guard with floor of car, so as to be lowered by gripman when occasion requires. I is hinge fastening safety-guard to car. C shows the spring. F is the eyebolt for connecting rod with safety-guard and holding spring in place. S is plate which fastens rubber to iron plate.

Fig. 6 is a back side view of safety-guard. S shows iron plate and bolts fastening rubber to iron plate.

I claim as my invention—

The combination, with the iron plate A, having the rubber edge B and attached to the car or dummy by hinges I, of the spring C, and connecting rod or pedal D, as shown and described.

In testimony that I claim the foregoing I have hereunto set my hand this 4th day of May, A. D. 1889.

HORACE EWING.

Witnesses:
 LEE D. CRAIG,
 FISHER AMES.